(12) United States Patent
Bauer

(10) Patent No.: US 9,504,264 B2
(45) Date of Patent: Nov. 29, 2016

(54) METHOD FOR PREPARING MEAT SLICES

(71) Applicant: HOLLYMATIC CORPORATION, Countryside, IL (US)

(72) Inventor: Erik Bauer, Alto, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 31 days.

(21) Appl. No.: 14/501,609

(22) Filed: Sep. 30, 2014

(65) Prior Publication Data

US 2016/0088851 A1  Mar. 31, 2016

(51) Int. Cl.
*A22C 17/00* (2006.01)
*A23L 1/31* (2006.01)
*A23L 1/315* (2006.01)

(52) U.S. Cl.
CPC ......... *A22C 17/0033* (2013.01); *A22C 17/002* (2013.01); *A22C 17/0006* (2013.01); *A22C 17/0013* (2013.01); *A23L 1/31* (2013.01); *A23L 1/315* (2013.01); *A23L 1/3155* (2013.01)

(58) Field of Classification Search
CPC ............ A22C 17/006; A22C 17/0013; A22C 17/002; A22C 17/0033; A22C 21/0023; A22C 21/003; A23L 1/03; A23L 1/315; A23L 1/3155
USPC .......... 426/518, 641, 644, 645, 646; 83/861, 83/862, 863, 864, 51, 932
See application file for complete search history.

(56) References Cited

U.S. PATENT DOCUMENTS

| 2,461,291 | A | | 2/1949 | McKee | |
|---|---|---|---|---|---|
| 2,980,541 | A | | 4/1961 | MacDonald | |
| 3,051,583 | A | * | 8/1962 | Tindall | B65D 5/4204 206/409 |
| 3,666,489 | A | * | 5/1972 | Lovell | A23L 1/3152 426/106 |
| 4,057,650 | A | | 11/1977 | Keszler | |
| 4,132,810 | A | | 1/1979 | Knutson | |
| 4,378,379 | A | * | 3/1983 | Liesaus | B65B 25/067 426/513 |
| 5,069,914 | A | * | 12/1991 | Gagliardi, Jr. | A23L 1/3175 426/104 |
| 5,595,776 | A | * | 1/1997 | Selz | A23L 1/31 426/272 |
| 6,039,995 | A | | 3/2000 | Zamzow | |
| 6,045,841 | A | * | 4/2000 | Singh | A23L 1/3106 426/243 |
| 6,136,360 | A | * | 10/2000 | Tsuchida | A21D 6/00 425/305.1 |
| 6,407,818 | B1 | * | 6/2002 | Whitehouse | A22C 17/002 250/559.21 |
| 7,592,029 | B1 | * | 9/2009 | Linck | A01J 27/04 426/518 |
| 2013/0042577 | A1 | | 2/2013 | Magee | |

OTHER PUBLICATIONS

Bacon Jerky NPL, published Feb. 2, 2013, http://web.archive.org/web/20130202082935/http://www.jerky.com/t/jerky/bacon-jerky.*
Aidells, B etal. The Complete Meat Cookbook, Houghton Mifflin Harcourt, Sep. 25, 2001, pp. 217-219.
International Search Report dated Dec. 18, 2015, issued by the International Searching Authority in corresponding International Application No. PCT/US15/47856.
Written Opinion dated Dec. 18, 2015, issued by the International Searching Authority in corresponding International Application No. PCT/US15/47856.

* cited by examiner

*Primary Examiner* — Drew Becker
*Assistant Examiner* — Bryan Kim
(74) *Attorney, Agent, or Firm* — Sughrue Mion, PLLC

(57) ABSTRACT

A method for cutting a meat portion to make a plurality of meat slices includes cutting the meat portion from an edge of a first end towards a second position before an edge of a second end spanning a horizontal lengthwise direction in a first cut; and cutting the meat portion from the edge of the second end towards a first position before the edge of the first end spanning the horizontal lengthwise direction in a second cut.

11 Claims, 4 Drawing Sheets

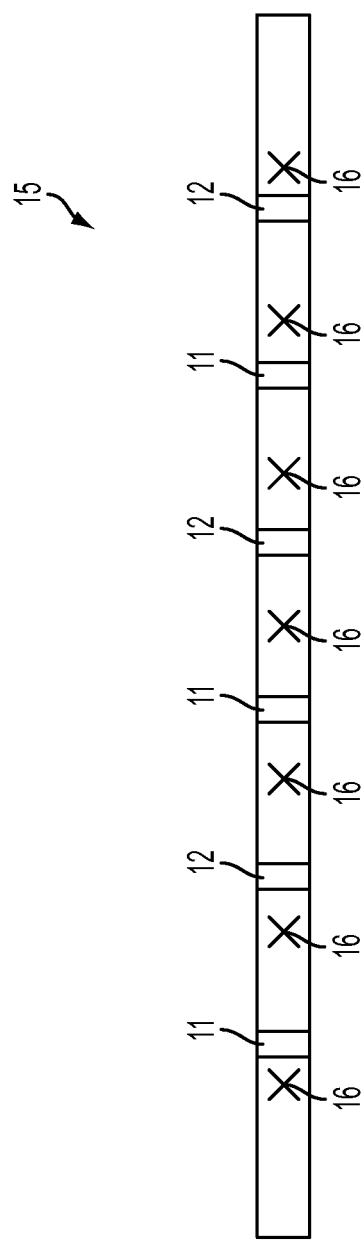

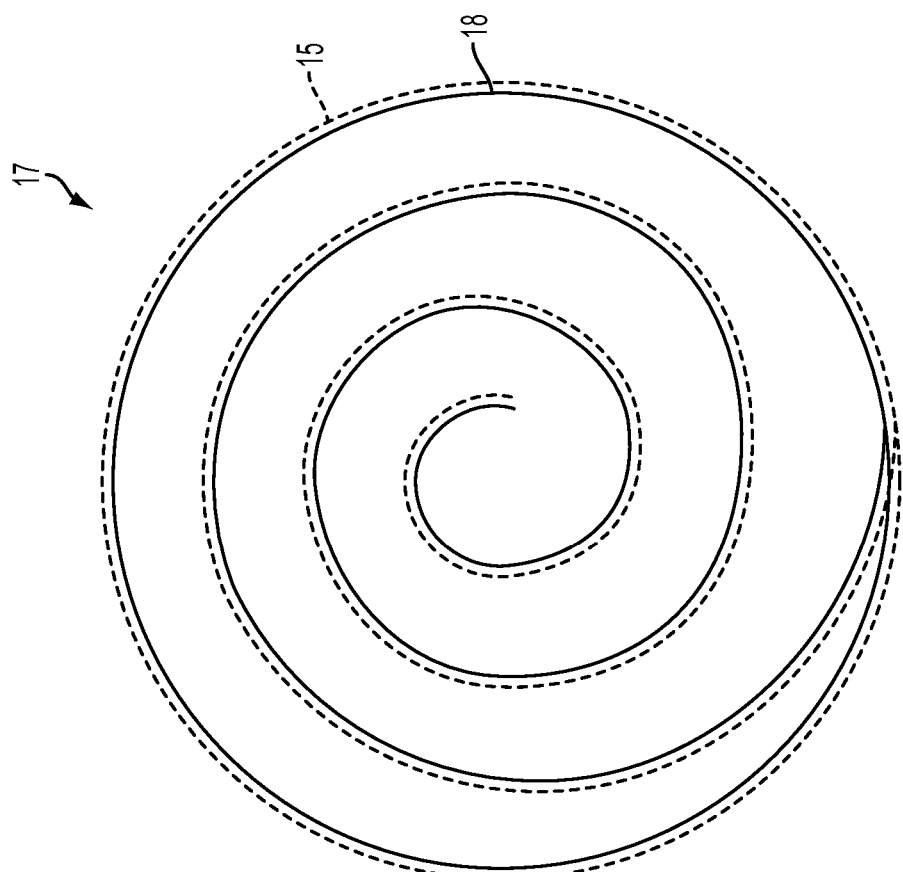

METHOD FOR PREPARING MEAT SLICES

BACKGROUND

1. Technical Field

Exemplary embodiments relate to a method for preparing and packaging meat slices. In particular, exemplary embodiments relate to a method for preparing and packaging meat slices in order to maximize the amount of meat used for a specific application (e.g., bacon, turkey bacon, beef bacon, jerky, etc.).

2. Description of the Related Art

In a related art, a pork belly 1 of a pig may be cut into slices to make bacon. However, when slicing the pork belly 1 in the related art, the pork belly 1 must be cut to conform to the standard packaging size 2 of standard bacon packaging material in order to ensure that the bacon slices can fit into the standard packaging size 2 of standard bacon packaging material. Therefore, in the related art, excess pork belly 3 (as shown in FIG. 1) that is greater than the size 2 of standard bacon packaging material must be cut off and either discarded or used as lower value pork (e.g., restaurant pork belly or bacon bits). Moreover, even if the excess pork belly 3 is used as bacon bits, restaurants and consumers are not willing to pay as much for bacon bits in comparison to bacon slices.

Thus, there is a need for a method to cut the pork belly in order to maximize the amount of pork belly that can be used for bacon. This will ensure that no excess pork belly 3 gets wasted or used for lower value pork (e.g., restaurant pork belly or bacon bits). Moreover, there is a need to package the maximized bacon slices for selling to grocery stores and consumers.

SUMMARY

Exemplary embodiments may provide a method for preparing meat slices in order to maximize the amount of meat used for a specific application (e.g., bacon, turkey bacon, beef bacon, jerky, etc.). In particular, the exemplary embodiments may provide a method for cutting pork belly in order to maximize the amount of pork belly that is used for bacon slices. Further, the exemplary embodiments may provide a method for cutting beef in order to maximize the amount of beef that is used for beef jerky slices or beef bacon slices. Further, the exemplary embodiments may provide a method for cutting turkey in order to maximize the amount of turkey that is used for turkey bacon.

Exemplary embodiments may also provide a method for packing the prepared meat slices.

According to an aspect of an exemplary embodiment, a method of cutting a meat portion to make a plurality of meat slices includes cutting the meat portion from an edge of a first end towards a second position before an edge of a second end spanning a horizontal lengthwise direction in a first cut; and cutting the meat portion from the edge of the second end towards a first position before the edge of the first end spanning the horizontal lengthwise direction in a second cut.

An exemplary embodiment may include the second cut occurring at a position displaced from the first cut and closer to a shoulder end of the meat portion than the first cut.

An exemplary embodiment may include folding the meat portion at the first position and the second position to make an elongated meat portion.

An exemplary embodiment may include cutting the elongated meat portion at a plurality of positions to make the meat slices.

An exemplary embodiment may include at least a first slicing position and a second slicing position of the plurality of slicing positions being positioned before the first position and the second position, respectively, such that each of the meat slices conforms to a standard meat portion slice packaging size.

An exemplary embodiment may include the meat portion including a pork belly, and the meat slices may include a plurality of bacon slices.

An exemplary embodiment may include the meat portion including a beef portion, and the meat slices may include a plurality of jerky slices.

An exemplary embodiment may include the meat portion including a turkey portion, and the meat slices may include a plurality of turkey bacon slices.

An exemplary embodiment may include the meat portion including a beef portion, and the meat slices may include a plurality of beef bacon slices.

According to another aspect of an exemplary embodiment, a method of cutting a meat portion for packing includes cutting the meat portion from an edge of a first end towards a second position before an edge of a second cut in a first cut; cutting the meat portion from the edge of the second end towards a first portion before the edge of the first end in a second cut; and folding the meat portion at the first position and the second position to make an elongated meat portion.

An exemplary embodiment may include the second cut occurring at a position displaced from the first cut and closer to a shoulder end of the meat portion than the first cut.

An exemplary embodiment may include packaging the elongated meat portion by rolling the elongated meat portion around a paper roll.

An exemplary embodiment may include a grease barrier disposed on at least one of a top surface and a bottom surface of the paper roll to adhere the elongated meat portion to the paper roll.

An exemplary embodiment may include the meat portion including a pork belly.

An exemplary embodiment may include the meat portion including a beef belly.

An exemplary embodiment may include the meat portion including a turkey portion.

According to yet another aspect of an exemplary embodiment, a method of cutting an elongated meat portion including a first folded portion and a second folded portion to make a plurality of meat slices includes cutting at a first slicing position before the first folded position of the elongated meat portion; and cutting at a second slicing position before the second folded position of the elongated meat portion. The first slicing position occurs at a position before the second slicing portion in a horizontal lengthwise direction.

An exemplary embodiment may include the first slicing position being at a different distance from the first folded position in comparison to a distance of the second slicing position from the second folded position.

An exemplary embodiment may include each of the first slicing position and the second slicing position being positioned before the first position and the second position, respectively, such that each of the meat slices conforms to a standard meat portion slice packaging size.

An exemplary embodiment may include the meat slices including a plurality of jerky slices.

An exemplary embodiment may include the meat slices including a plurality of turkey bacon slices.

An exemplary embodiment may include the meat slices including a plurality of beef bacon slices.

An exemplary embodiment may include the meat slices including a plurality of bacon slices.

BRIEF DESCRIPTION OF THE DRAWINGS

Illustrative, non-limiting example embodiments will be more clearly understood from the following detailed description taken in conjunction with the accompanying drawings.

FIG. 3 is a view illustrating an exemplary embodiment of an elongated pork belly strip.

FIG. 4 is a view illustrating an exemplary embodiment of a packaging of the elongated pork belly strip in FIG. 3.

DETAILED DESCRIPTION OF THE EXEMPLARY EMBODIMENTS

Figure 1:
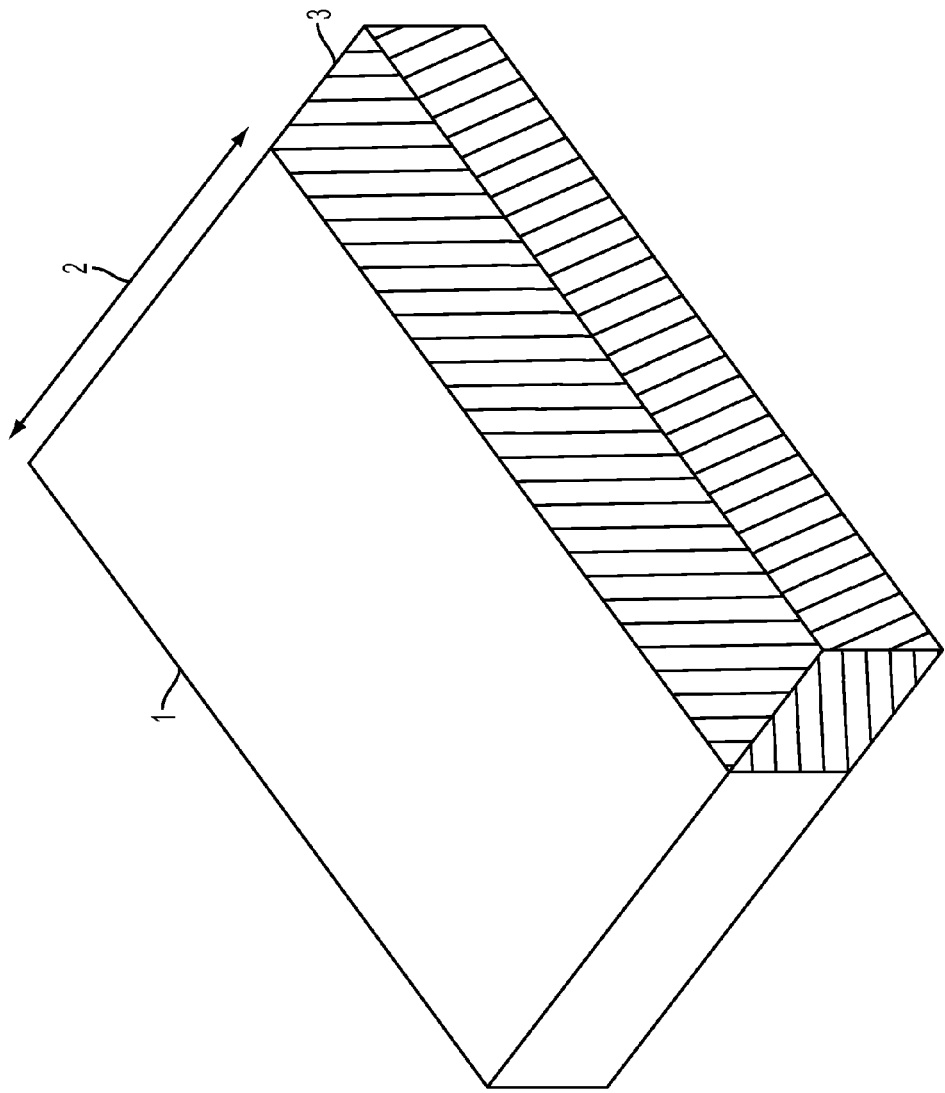
FIG. 1 is a view illustrating a related art pork belly used in the related art method of preparing bacon slices.

Various example embodiments will be described more fully hereinafter with reference to the accompanying drawings, in which some example embodiments are shown. Example embodiments may, however, be embodied in many different forms and should not be construed as limited to the example embodiments set forth herein. Rather, these example embodiments are provided so that this disclosure will be thorough and complete, and will fully convey the scope of the embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the embodiments. As used herein, the term "and/or" includes any and all combinations of one or more of the associated listed items.

The terminology used herein is for the purpose of describing particular example embodiments only and is not intended to be limiting of the embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view illustrating a related art pork belly used in the related art method of preparing bacon slices.

As shown in FIG. 1, the related art pork belly 1 may comprise a portion which is cut and excess pork belly 3. In the related art, the portion of the pork belly 1 which is cut must conform to the standard packaging size 2 in order to be sold in grocery stores and/or restaurants. Therefore, in the related art, the excess pork belly 3 is cut off from the pork belly 1 and is either discarded or used as low value pork (e.g., restaurant pork belly or bacon bits). When the excess pork belly 3 is used as restaurant pork belly or bacon bits, customers will pay less for the excess pork belly 3 than bacon slices. Therefore, the exemplary embodiments provide a method to ensure that no pork belly gets discarded or used as low value pork.

Figure 2:
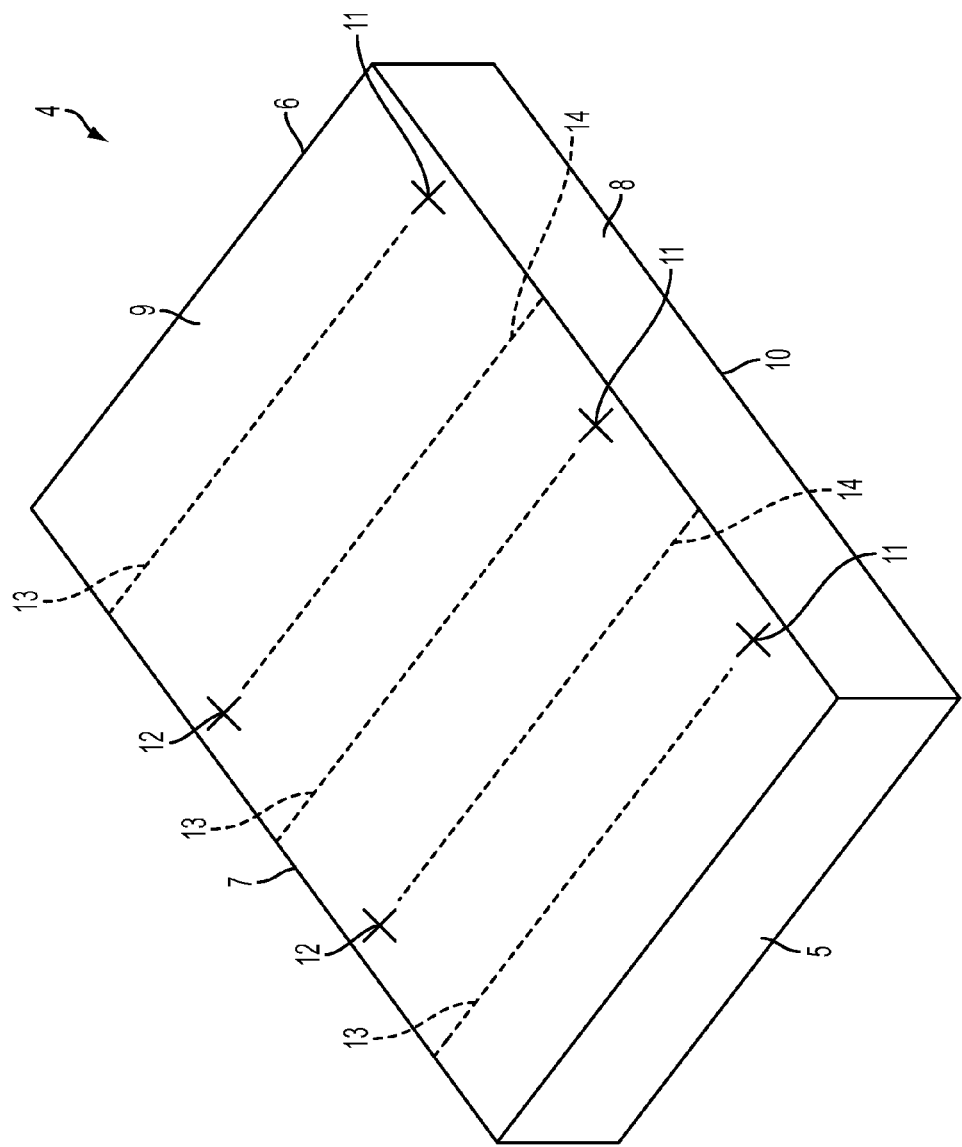
FIG. 2 is a view illustrating an exemplary embodiment of a pork belly used in a method of preparing bacon slices.

FIG. 2 is a view illustrating an exemplary embodiment of a pork belly used in a method of preparing bacon slices.

As shown in FIG. 2, a pork belly 4 may comprise a shoulder end 5, a flank end 6, a first end 7, a second end 8, a lean side 9, and a skinned side 10. Further, as shown in FIG. 2, the lean side 9 is a top face of the pork belly 4 and the skinned side 10 is a bottom face of the pork belly 4. In FIG. 2, the shoulder end 5 is a bottom side face of the pork belly 4 and the flank end 6 is a top side face of the pork belly 4. As shown in FIG. 2, the first end 7 is a left side face of the pork belly 4 and the second end 8 is a right side face of the pork belly 4. However, the exemplary embodiments are not limited, and the orientation of the pork belly 4 may be variously modified. For example, the orientation of the pork belly 4 may be modified such that the first end 7 is a right side face of the pork belly 4, the second end 8 is a left side face of the pork belly 4, the lean side 9 is the bottom face of the pork belly 4, the skinned side 10 is the top face of the pork belly 4, etc. The pork belly 4 may be cured before being cut. However, exemplary embodiments are not limited to the above description. In another exemplary embodiment, the pork belly 4 may also be raw before being cut or smoked before being cut.

In FIG. 2 of the exemplary embodiments, the pork belly 4 may be cut such a first cut 13 extends from an edge of the first end 7 towards the second end 8. However, when the first cut 13 is made in the pork belly 4, the first cut 13 does not extend all the way across the first end 7 and the second end 8. In the exemplary embodiments, the first cut 13 extends from the edge of the first end 7 towards a second position 11 before an edge of the second end 8. In an exemplary embodiment, the second position 11 may be in a range between 1/16 to 3/8 inches from the edge of the second end 8. Further, in a preferred exemplary embodiment, the second position 11 may be in a range between 1/8 to 1/4 inches from the edge of the second end 8. Then, in the exemplary embodiments, the pork belly 4 may be cut such that a second cut 14 extends from an edge of the second end 8 towards the first end 7. However, similar to the first cut 13, the second cut 14 does not extend all the way across the first end 7 and the second end 8. In the exemplary embodiments, the second cut 14 extends from the edge of the second end 8 towards a first position 12 before an edge of the first end 8. In an exemplary embodiment, the first position 12 may be in a range between 1/16 to 3/8 inches from the edge of the first end 7. Further, in a preferred exemplary embodiment, the first position 12 may be in a range between 1/8 to 1/4 inches from the edge of the first end 7. Further, the second cut 14 may occur at a lower vertical position than the first cut 13. The second cut 14 may occur at a position closer to the shoulder end 5 of the pork belly 4 than the first cut 13. The method of cutting the pork belly 4 with the first cut 13 and the second cut 14 may be repeated when moving towards the shoulder end 5 of the pork belly 4. If the method of cutting the pork belly 4 is repeated, the first cut 13 and the second cut 14 may be alternately cut in a vertical width direction when moving towards the shoulder end 5 of the pork belly. In other words, the first cut 13 may occur first, then the second cut 14 may occur at a lower vertical position than the first cut 13, then another first cut 13 may occur at a lower vertical position than the second cut 14, then another second cut 14 may occur at a lower vertical position than the another first cut 13, etc. The first cut 13 and the second cut 14 are cut in a horizontal lengthwise direction perpendicular to the vertical width direction when moving towards the shoulder end 5 of the pork belly.

FIG. 3 is a view illustrating an exemplary embodiment of an elongated pork belly strip.

After the pork belly 4 has been repeatedly and alternately cut in a vertical width direction with the first cut 13 and the second cut 14 towards the shoulder end 5 of the pork belly 4, the pork belly 4 will still comprise one whole piece which is separated by cuts extending from the first end to the second end. As the cuts (e.g., first cut 13 and second cut 14) do not extend all the way across the first end 7 and the second end 8, the pork belly 4 is not yet separated into bacon slices.

Therefore, in order to create bacon slices, the whole piece of pork belly 4 is folded at each of the first positions 12 and the second positions 11 to create an elongated pork belly strip 15. FIG. 3 shows the elongated pork belly strip 15, which is created by folding the pork belly 4 at each of the first positions 12 and the second positions 11. After the elongated pork belly strip 15 has been created, various cuts 16 may be made at various positions to create bacon slices. In an exemplary embodiment, at least the first cut of the various cuts 16 may be made before the first positions 12 and the second positions 11 such that the bacon slices will conform to the standard bacon packaging size 2 (see standard packaging size 2 in FIG. 1). In an exemplary embodiment, each of the bacon slices is in a range between 6-11 inches. A preferred embodiment of the bacon packaging size may be substantially 8 inches or substantially 10 inches.

Therefore, in contrast to the related art, by making the first cut 13 and the second cut 14 of the pork belly 4 so that the cuts extend only to a second position 11 and a first position 12, respectively and extend all the way to the other respective ends 7, 8 of the pork belly 7, folding the pork belly 4 at these positions (e.g., second position 11 and first position 12) to create an elongated pork belly strip 15, and making various cuts 16 at various positions of the elongated pork belly strip 15, the resultant bacon slices fit the standard bacon packaging size. Thus, as compared to the related art, no excess pork belly 3 would be discarded or used for lower value pork (e.g., restaurant pork belly or bacon bits). For example, assuming an exemplary pork belly 15 having a length from the first end 7 to the second end 8 of 12 inches, the elongated pork belly 15 could be cut in 9 inch bacon slices. Further, each of the various cuts 16 may be made at different positions before and after the first position 12 and the second position 11 such that each bacon slice would have a same bacon slice size such that each of the resultant bacon slices would conform to the standard bacon packaging size. The resultant bacon slices may also be cooked before being packaged for consumers.

FIG. 4 is a view illustrating an exemplary embodiment of a packaging of the elongated pork belly strip in FIG. 3.

In another exemplary embodiment shown in FIG. 4, the elongated pork belly strip 15 can be rolled or spun around a paper roll 18. In this exemplary embodiment, various cuts 16 are not made at the various positions of the elongated pork belly strip 15. Therefore, as shown in FIG. 4, the elongated pork belly strip 15 is rolled or spun around the paper roll 18 to form a circular roll 17. The elongated pork belly strip 15 can be packaged for sale in this configuration. In an exemplary embodiment, the elongated pork belly strip 15 may be cooked before being rolled or spun around the paper roll 18. However, exemplary embodiments are not limited. In another exemplary embodiment, the elongated pork belly strip 15 may be cooked after being rolled or spun around the paper roll 18.

In FIG. 4 of the exemplary embodiments, various types of paper rolls can used, including a special type of paper used for adhering to the elongated pork belly strip 15. The special type of paper used for adhering to the elongated pork belly strip 15 may comprise a grease barrier (not shown). The grease barrier may be placed on both sides of the paper roll 18. The grease barrier may comprise a wax paper, thick layer of paper, etc. Therefore, the special type of paper used for adhering to the elongated pork belly strip 15 may be thicker than paper rolls in the related art.

Although exemplary embodiments have been described using pork belly to create bacon slices, exemplary embodiments are not limited. In fact, the method for preparing meat slices may comprise the method for preparing jerky. As jerky can be made from various animals including bovine, pork, goat, mutton, lamb, deer, elk, caribou, kudu, springbok, kangaroo, bison, moose, turkey, ostrich, salmon, alligator, tuna, emu, horse, and camel, the method for preparing jerky will include all of these various animals. However, the method for preparing jerky may also include other various animals that would be apparent to one of ordinary skill in the art. The method for preparing jerky may include jerky slices (similar to bacon slices) and/or jerky rolled or spun around a paper roll (similar to the elongated pork belly strip 15 rolled or spun around the paper roll 18).

Although exemplary embodiments have been described using pork belly to create bacon slices, the method for preparing meat slices may comprise the method for preparing bacon from other various animals. In fact, as bacon may be made from various other animals including beef, lamb, chicken, goat, and turkey, the method for preparing bacon will include all of these various animals. However, the method for preparing bacon may also include other various animals that would be apparent to one of ordinary skill in the art. In an exemplary embodiment, the method for preparing turkey bacon may include turkey bacon slices (similar to bacon slices from pork belly) and/or turkey bacon rolled or spun around a paper roll (similar to the elongated pork belly strip 15 rolled or spun around the paper roll 18).

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the exemplary embodiments. Accordingly, all such modifications are intended to be included within the scope of the embodiments as defined in the claims. Therefore, it is to be understood that the foregoing is illustrative of various exemplary embodiments and is not to be construed as limited to the specific example embodiments disclosed, and that modifications to the disclosed example embodiments, as well as other example embodiments, are intended to be included within the scope of the appended claims.

What is claimed is:

1. A method of cutting a meat portion to make a plurality of meat slices, comprising:
    cutting through an entire thickness of the meat portion in a direction extending from an edge of a first end towards a second position before an edge of a second end in a first cut;
    cutting through the entire thickness of the meat portion in a direction extending from the edge of the second end towards a first position before the edge of the first end in a second cut; and folding the meat portion at the first position and the second position to make an elongated meat portion;
    wherein the second cut occurs at a position displaced from the first cut and closer to a shoulder end of the meat portion than the first cut,
        the meat portion is a pork belly having a lean side as a top face and a skinned side as a bottom face or having the lean side as the bottom face and the skinned side as the top face, and
        the extending directions of the first cut and the second cut are in a plane substantially parallel with both the top face and the bottom face.

2. The method of claim 1, further comprising:
    cutting the elongated meat portion at a plurality of slicing positions to make the meat slices.

3. The method of claim 2, wherein at least a first slicing position and a second slicing position of the plurality of slicing positions are positioned before the first position and the second position, respectively, such that each of the meat slices conforms to a standard meat portion slice packaging size.

4. The method of claim 1, wherein the meat slices comprise a plurality of bacon slices.

5. The method of claim 1, further comprising:
    packaging the elongated meat portion by rolling the elongated meat portion around a paper roll.

6. The method of claim 5, further comprising:
    a grease barrier disposed on at least one of a top surface and a bottom surface of the paper roll to adhere the elongated meat portion to the paper roll.

7. A method of cutting a meat portion to make a plurality of meat slices, the method comprising cutting through an entire thickness of the meat portion in a direction extending from an edge of a first end towards a second position before an edge of a second end in a first cut; cutting through an entire thickness of the meat portion in a direction extending from the edge of the second end towards a first position before the edge of the first end in a second cut; folding the meat portion at the first position and the second position to make an elongated meat portion:
    cutting at a first slicing position before the first position of the elongated meat portion; and
    cutting at a second slicing position before the second position of the elongated meat portion,
    wherein the second cut occurs at a position displaced from the first cut and closer to a shoulder end of the meat portion than the first cut,
        the first slicing position occurs at a position before the second slicing portion in a horizontal lengthwise direction,
        the meat portion is a pork belly having a lean side as a top face and a skinned side as a bottom face or having the lean side as the bottom face and the skinned side as the top face, and
        the extending directions of the first cut and the second cut are in a plane substantially parallel with both the top face and the bottom face.

8. The method of claim 7, wherein the first slicing position is at a different distance from the first folded position in comparison to a distance of the second slicing position from the second folded position.

9. The method of claim 7, wherein each of the first slicing position and the second slicing position are positioned before the first position and the second position, respectively, such that each of the meat slices conforms to a standard meat portion slice packaging size.

10. The method of claim 7, wherein the meat slices comprise a plurality of jerky slices.

11. The method of claim 7, wherein the meat slices comprise a plurality of bacon slices.

* * * * *